Figure 4:
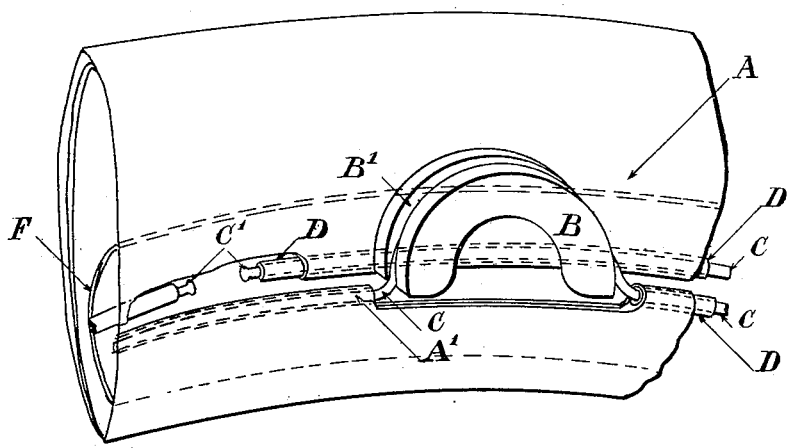

No. 615,062.  
M. M. DESSAU.  
PNEUMATIC TIRE.  
(Application filed Dec. 24, 1897.)  
Patented Nov. 29, 1898.
(No Model.) 2 Sheets—Sheet 1.
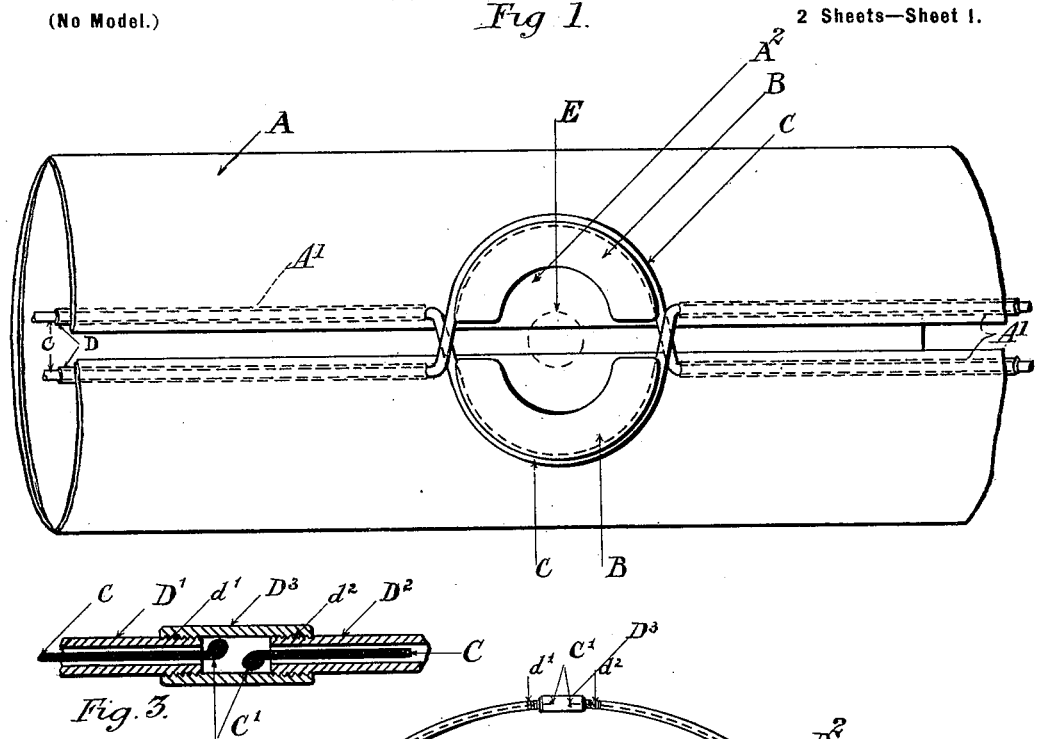
Fig. 1.
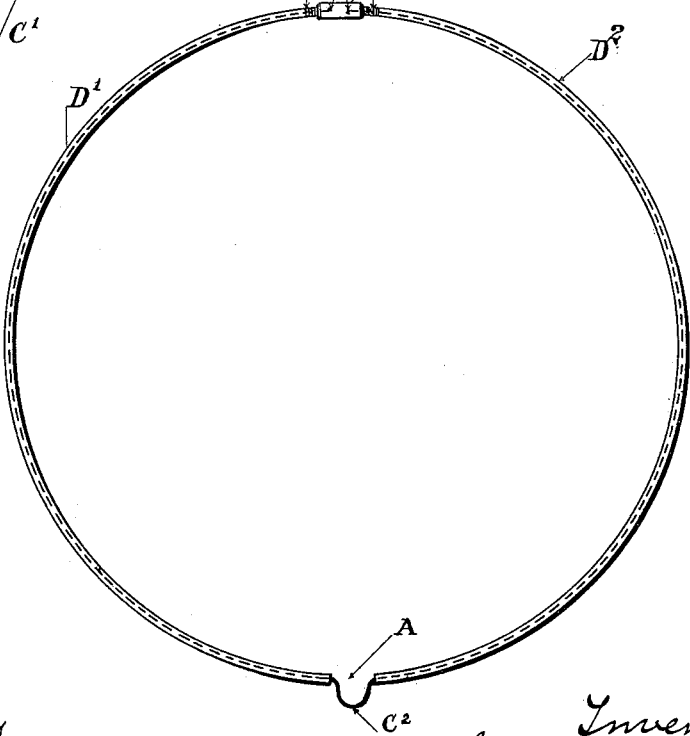
Fig. 3.
Fig. 2.
Witnesses  
Inventor  
Morland Nicholl Dessau No. 615,062.  
M. M. DESSAU.  
PNEUMATIC TIRE.  
(Application filed Dec. 24, 1897.)  
(No Model.)

Patented Nov. 29, 1898.

2 Sheets—Sheet 2.

UNITED STATES PATENT OFFICE.

MORLAND MICHOLL DESSAU, OF LONDON, ENGLAND.

PNEUMATIC TIRE.

SPECIFICATION forming part of Letters Patent No. 615,062, dated November 29, 1898.

Application filed December 24, 1897. Serial No. 663,330. (No model.)

*To all whom it may concern:*

Be it known that I, MORLAND MICHOLL DESSAU, a citizen of the United States of America, residing at Ealing, London, in the county of Middlesex, England, have invented certain new and useful Improvements in or Relating to Pneumatic Tires, (for which I have obtained Letters Patent in France, No. 263,490, dated January 27, 1897, and in Great Britain, No. 28,766, dated December 15, 1896,) of which the following is a specification.

This invention relates to pneumatic tires, its object being to provide a contractile means for retaining the tire or cover upon the rim which will allow it to be readily removed, if desired.

According to this invention a tire or tire-cover is formed having in each of its two edges a passage or channel extending around the circumference of the tire or cover and through which a wire, a length of catgut, or other suitable ligature passes freely. The ends of the wire or other ligature placed in this pocket are subsequently enlarged or formed with heads.

The passage or channel is preferably lined with some durable material for the whole or part of its length, a convenient method being to interweave with the fabric of the tire at that part some metallic threads. Another convenient construction is that in which the passage is lined with a metallic tube or a metallic trough of the shape of a half-tube.

An opening is made in the channel at a point preferably diametrically opposite the ends of the wire, at which opening the wire or ligature is intercepted and caused to embrace a projection upon the opposite edge of the tire or tire-cover.

The act of inflation when the tire is in position on the rim of a wheel of, say, channel-section, the tire being made according to this invention, at first causes the edges of the cover to separate somewhat, thus drawing the wire in each edge, by means of the projection on the opposite edge, from the opening in the channel. By this means the effective length of the wire is reduced and the edges of the tire drawn down into the rim, and the further inflation of the tire contracts the circumference of the circle and causes the edges to be securely gripped upon the rim.

In order that this invention may be clearly understood, it will now be described in connection with a pneumatic tire carried by a wheel-rim of channel-section, the channel being, say, of approximately semicircular shape in cross-section.

One construction of tire-cover according to this invention for use with such a rim is illustrated in Figure 1 of the accompanying drawings, Figs. 2 and 3 being views of details of construction, and Fig. 4 of a modification.

Like letters refer to like parts in all figures.

A is the tire-cover, having projections B. These projections may be of any desired shape. That shown at B is a convenient construction.

C are the ligatures, such as wires or pieces of gut, running in the sheathings D, contained in the channels A' in the edges of the tire-cover A. The sheathing is shown in the drawings formed of a metallic tube; but a trough-like sheathing of any convenient form may be employed. A construction of sheathing which is preferred and which readily permits of repairs to the ligature is shown in Figs. 2 and 3, where the sheathing-tube D is shown divided into two portions D' D². One extremity of each is screw-threaded, as at d' d², one right-handedly and the other left-handedly. The ligature C is then threaded into the tubes and the knobs or heads C' formed upon the ends. The tubes D' D² are then united by a coupling D³, which is internally screw-threaded at its ends to engage with the screws d' d², as will be readily understood; but the device is equally effective when the ends are not so coupled, as seen at C' in Fig. 4. Each of the two ligatures C must be of sufficient length to allow of a loop, such as C², being slipped over the projection B on the opposite edge of the tire. In Fig. 1 the two ligatures of the tire-cover are shown in position embracing the projections B, each of which is secured to its tire-cover edge in the opening A' on that edge at which the loop C² emerges to embrace the opposite projection B. This loop is shown in Fig. 3 bent at right angles to its normal position. Any number of these loops may be used as desired, a corresponding number of projections being provided for them to engage with. Although this construction is preferred, since by employing projections B of the shape shown in the drawings a central aperture is left through which the valve-post of an air-tube may protrude, as shown in dotted lines at E, the projections may be placed at any desired points on the edges of the tire or tire-cover, provided an opening, such as A, for the loop C² is formed opposite to each projection in the other edge.

In the modification shown in Fig. 4 the grooved projections or the like are conveniently made as grooved rings cut in half, only about two being required to be attached to each edge of the cover, their relative positions being as shown in Fig. 3. Two retaining-wires C are here employed, being carried in pockets A' in the edges of the tire-cover. These pockets are cut away at the points in one edge of the cover which come opposite to the groove-rings B, attached to the other edge, the wires C being drawn out at these points and sprung into the grooves of the rings. Within the pockets A' on the edge of the cover and at suitable distances apart are placed short lengths of metal tube D, forming shields to protect the pockets through which the wires C pass. These pieces of metal tube are firmly held against longitudinal movement by the canvas or other material forming a pocket which fits tightly around them, or they may be fastened by other suitable means. Each wire C is not formed as a complete ring, but is cut at some point between two of the pieces of tube D, the two ends of the wire being enlarged or formed with heads C' to prevent their drawing through the tubes. The tubes are also arranged so as to strengthen the pockets A' at the points where they are cut away in order to allow of the wires C coming out and passing around the grooved projections B. The action of the arrangement is as follows: After placing the tire on the rim the loops of the wires C are sprung into the grooves B' of the rings B, when upon inflation the wires C will be drawn slightly within the pockets in the edge of the cover as the latter tend to draw away from each other, this shortening of the wires causing a pull of the ends of each wire on the lengths of the tube D, against which the ends C' bear, the result being a reduction in the diameter of the ring formed by the wires C, and consequently a gripping of the wire by the edges of the tire-cover. This action tends to create the movement of the tube against the wire and prevent the spreading of the cloth at the point where the wires or bands are situated.

If desired, the tubes D may extend completely around the edges of the cover except at those points where the wires emerge from the pockets to pass around the grooved projections B and where the ends of the wires are located. The shields or protectors D may be in the form of tubes divided longitudinally or pieces of metal shaped otherwise, as found convenient.

One edge of the cover preferably carries a canvas or other flap F, which covers over the edges of the tire-cover and forms a smooth surface against which the air-tube may lie.

If desired the grooved rings B may be dispensed with, a loop of one or both wires being passed over the valve, or a suitably-constructed valve-plate on the valve may serve instead of one of the grooved rings above described.

If desired, the ends C' of the wire C may overlap one another, each end being suitably secured to the fabric of the tire-cover.

I claim—

1. In a pneumatic tire, the combination with the cover provided with an edge channel having a lateral opening, a projection on the cover opposite said opening, and a ligature arranged within said channel and adapted to engage said projection, substantially as described.

2. In a pneumatic tire, the combination with the cover provided with edge channels having lateral openings, of ligatures in said channels, and projections on the cover opposite said openings, substantially as described.

3. In a pneumatic tire, the combination with a cover, of grooved buttons or rings arranged alternately on the opposite edges of the cover, and a bent wire engaging with the grooves in the buttons, substantially as described.

4. In a pneumatic tire, the combination with the cover provided with edge channels having lateral openings at intervals, and sheathings in said channels, of ligatures in said channels, and projections on the cover at its edges opposite said openings, substantially as described.

5. In a pneumatic tire, the combination with the cover provided with edge channels having lateral openings, of tubes arranged within said channels, a coupling for the tubes, ligatures in said tubes, and projections on the cover adapted to be engaged by said ligatures, substantially as described.

In witness whereof I have hereto set my hand in the presence of the two subscribing witnesses.

MORLAND MICHOLL DESSAU.

Witnesses:
HAROLD WADE,
HARRY B. BRIDGER.